United States Patent [19]

Ro et al.

[11] Patent Number: 5,768,458
[45] Date of Patent: Jun. 16, 1998

[54] OPTICAL COUPLING DEVICE WITH BALL LENS AND METHOD FOR MANUFACTURING THE SAME

[75] Inventors: Jong-Wong Ro; Yeong-Ju Kim, both of Gumi; Keon-Joon Ahn, Daegukwangyeok, all of Rep. of Korea

[73] Assignee: Samsung Electronics Co., Ltd., Kyungki-do, Rep. of Korea

[21] Appl. No.: 742,664

[22] Filed: Nov. 5, 1996

[30] Foreign Application Priority Data

Nov. 10, 1995 [KR] Rep. of Korea ............ 40650/1995

[51] Int. Cl.⁶ .................................................. G02B 6/36
[52] U.S. Cl. ........................ 385/79; 385/61; 385/74; 385/85; 385/93
[58] Field of Search ............................. 385/79, 74, 85, 385/61, 88–94

[56] References Cited

U.S. PATENT DOCUMENTS 4,781,431  11/1988  Wesson et al. ........................ 385/79
5,432,880   7/1995  Diner ..................................... 385/85
5,452,389   9/1995  Tonai .................................... 385/92
5,586,208  12/1996  Nishiyama ............................ 385/93

*Primary Examiner*—Phan T. H. Palmer
*Attorney, Agent, or Firm*—Sughrue, Mion, Zinn, Macpeak & Seas, PLLC

[57] ABSTRACT

An optical coupling device includes a ferrule that holds an optical fiber; a ball lens that focuses light from the optical fiber upon a point; and a housing that aligns the ferrule and the ball lens. A method for manufacturing such an optical coupling device includes the steps of fabricating a ferrule to support and hold a single-core optical fiber; inserting and fitting the single-core optical fiber into the center of the ferrule; grinding the face of the ferrule holding the single-core optical fiber; fabricating a ball lens whose surface is coated with an anti-reflection film to focus light from the single-core optical fiber on a point; fabricating an integral housing on the basis of a calculation of an offset distance for aligning the ferrule and the ball lens; fixing the ferrule to the inside of the housing; and pushing the ball lens into the housing with a predetermined pressure to fix the ball lens to the inside of the housing.

15 Claims, 3 Drawing Sheets

5,768,458

OPTICAL COUPLING DEVICE WITH BALL LENS AND METHOD FOR MANUFACTURING THE SAME

BACKGROUND OF THE INVENTION

1. Field of the Invention:

The present invention relates to an optical coupling device employing a ball lens. More particularly, it relates to an optical coupling device that has improved alignment of its ferrule and ball lens by offsetting the central axis of the ball lens from an optical axis without using an aligning tool, and further relates to a method for manufacturing such an optical coupling device.

The present application is based on Korean Application No. 40650/1995 which is incorporated herein by reference.

2. Description of the Related Art:

FIG. 1 is a schematic view of a conventional optical coupling device. The optical coupling device includes a ferrule 84 that supports and holds an optical fiber 86, a ferrule housing 80 to cover the ferrule 84, a projection 82 formed on one outer surface of the ferrule housing 80 to be welded to another optical coupling device, a ball lens 90 that focuses a light ray transmitted through the optical fiber 86, and a lens housing 88 that holds and protects the ball lens 90.

The following is a description of a method for manufacturing such an optical coupling device. The ferrule 84 with a hole therein is formed to hold single-core fiber or multicore optical fibers 86, and the optical fiber 86 is inserted into the hole of the ferrule 84. Subsequently, the face of the ferrule 84 is ground, and the ground ferrule 84 is epoxied or welded to the ferrule housing 80. The ball lens 90 that focuses light transmitted by the optical fiber 86 is fabricated to be fitted into the lens housing 88. The ferrule housing 80 containing the ferrule 84 and the lens housing 88 holding the ball lens 90 are positioned relatively by using an aligning tool. One side of the ferrule housing 80 is welded to one side of the lens housing 88.

As mentioned above, epoxying or welding is required to manufacture the conventional device having the ferrule housing 80 and lens housing 88 for respectively holding the ferrule 84 and the ball lens 90, which makes the manufacturing process complicated and causes low productivity. The joint of the ferrule housing 80 and the lens housing 88 has poor temperature, vibration and impact characteristics. Also, a precise aligning tool is required since an optical path is offset from the center of the ball lens 90 in order to reduce the reflection loss of the optical coupling device, which results in increased manufacturing costs. Moreover, since the ball lens 90 of this conventional optical coupling device is either welded or epoxied to the ferrule 84, it is impossible to reuse the ball lens 90.

SUMMARY OF THE INVENTION

Accordingly, it is a first object of the present invention to provide an optical coupling device with a ball lens and its manufacturing method that substantially obviates one or more of the problems due to limitations and disadvantages of the conventional technique required to offset the central axis of the ball lens from an optical axis by a predetermined distance.

It is a second object of the present invention to provide an optical coupling device with a ball lens and a method for manufacturing such a device that is designed to meet the characteristics of the ambient environment such as temperature, vibration or shock.

It is a third object of the present invention to provide an optical coupling device with a ball lens and a method for manufacturing the same by using ferrules for at least a single-core optical fiber.

It is a fourth object of the present invention to provide an optical coupling device with a ball lens and a method for manufacturing the same in which the ball lens is tightly fitted into a housing so that the ball lens may be reused.

To achieve these and other advantages and in accordance with the purpose of the present invention, the optical coupling device of the present invention employing a ball lens, includes: a ferrule that holds an optical fiber; a ball lens that focuses light from the optical fiber upon a point; and a housing that aligns the ferrule and the ball lens.

In another aspect of the present invention, a method for manufacturing an optical coupling device for a single-core optical fiber, includes the steps of fabricating a ferrule to support and hold a single-core optical fiber; inserting and fitting the single-core optical fiber into the center of the ferrule; grinding the face of the ferrule holding the single-core optical fiber; fabricating a ball lens whose surface is covered with an anti-reflection film to focus light from the single-core optical fiber; fabricating a housing on the basis of a calculation of an offset distance for aligning the ferrule and the ball lens; fixing the ferrule to the inside of the housing; and pushing the ball lens into the housing with a predetermined pressure to fix the ball lens to the inside of the housing.

DETAILED DESCRIPTION OF THE PREFERRED EMBODIMENTS

Figure 1:
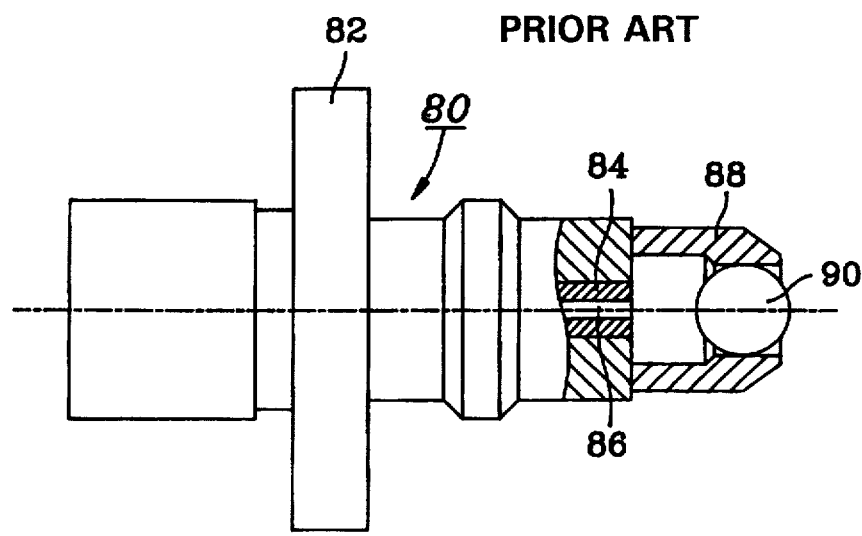
FIG. 1 is a schematic view of a conventional optical coupling device.
Figure 2:
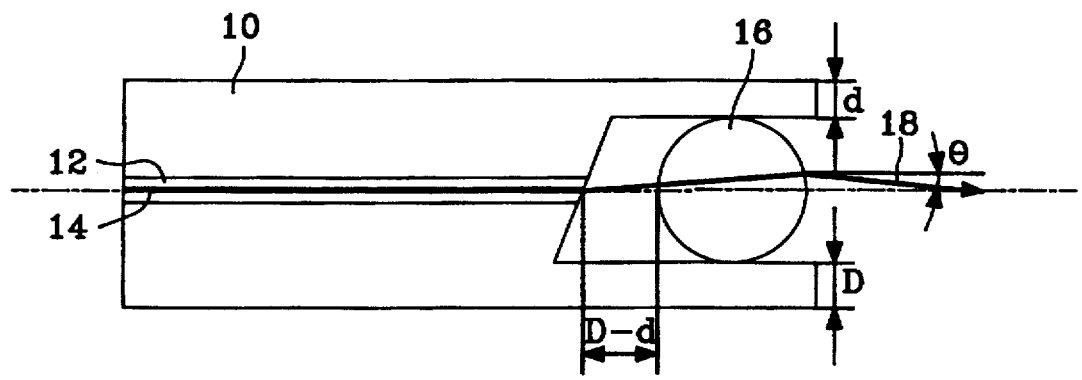
FIG. 2 is a schematic view of an optical coupling device in accordance with a preferred embodiment of the present invention.

As shown in FIG. 2, the inventive optical coupling device employing a ball lens of the preferred embodiment includes a ferrule 12 that holds an optical fiber 14, a ball lens 16 whose surface is coated with an anti-reflection film to focus light from the optical fiber 14 to a point, and an integral housing 10 that aligns the ferrule 12 and ball lens 16. The housing 10 simultaneously supports and holds both of the ferrule 12 and the ball lens 16.

A method for manufacturing such an optical coupling device includes the steps of fabricating a ferrule 12 to support and hold a single-core optical fiber 14; inserting the single-core optical fiber 14 into the center of the ferrule 12 to hold the fiber 14; grinding the face of the ferrule; fabricating a ball lens whose surface is covered with an anti-reflection film to focus light from the optical fiber 14; and fabricating a housing 10 on the basis of a calculation of an offset distance (D-d) in order to align the ferrule 12 and the ball lens 16. This offset-distance may be a difference between the focal length of the lens and the radius of the lens or may be calculated in another known manner. Preferably, the offset distance (D-d) is 100 μm, and an angle Ø of the light passing through the optical fiber 14 with respect to the output light's traveling axis is 8.6 degrees in order to maintain the reflection loss of the optical coupling device below −45 dB. The dimensions of the housing 10 are set to position the ball lens 16 and the ferrule 12 in the calculated relative positions. For example, abutment surfaces are defined in the housing or the housing is tapered in a desired manner.

An anti-reflection film is coated on each surface of the ball lens 16 and the optical fiber, and the ball lens 16 is designed to have a diameter of 2 mm and the wavelength of light is set to 155 μm in order that the offset distance (D-d) is 100 μm, and the angle Ø of the light passing through the optical fiber 14 with respect to the output light's traveling axis is 8.6 degrees. The method for manufacturing the optical coupling device also includes the steps of applying an anti-reflection film to the outer surface of the ferrule 12 and fitting the ferrule into the housing 10; and pushing the ball lens 16 into the housing 10 with a predetermined pressure to fix the ball lens to the housing 10 and position the ball lens 20 in the calculated manner.

Figure 3:
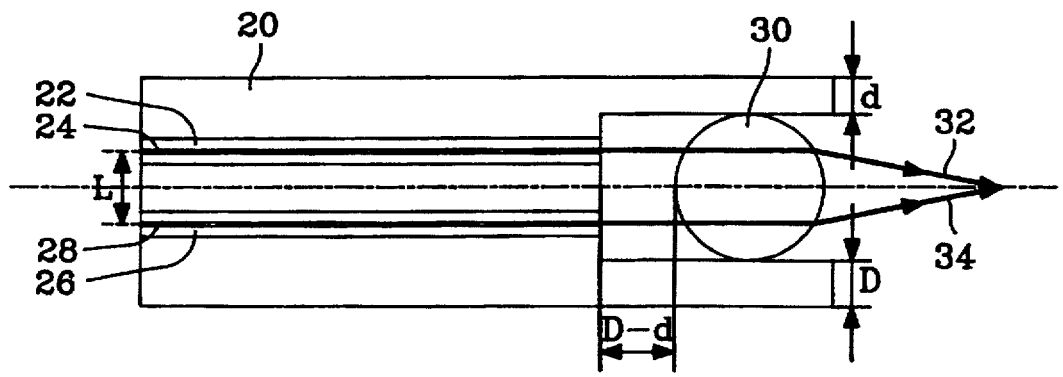
FIG. 3 is a schematic view of an optical coupling device in which dual-core optical fibers are arranged in accordance with the present invention.

FIG. 3 illustrates another preferred embodiment having dual-core optical fibers in accordance with the present invention. This embodiment includes ferrules 22 and 26 that respectively hold optical fibers 24 and 28, a ball lens 30 whose surface is coated with an anti-reflection film to focus a light rays 32 and 34 to a point, and a housing 20 that aligns each ferrule 22 and 26 and ball lens 30. The housing 20 is formed to simultaneously support and hold each ferrule 22 and 26 and the ball lens 30. This optical coupling device is designed to be capable of holding at least a single-core optical fiber.

A method for manufacturing such an optical coupling device includes the steps of fabricating ferrules 22 and 26 that respectively hold and support the dual-core optical fibers 24 and 28; inserting each one of the optical fibers 24 and 28 into the respective centers of the ferrules 22 and 28; grinding each face of the ferrules 22 and 26; fabricating a ball lens 30 whose surface is coated with an anti-reflection film to focus each light ray 30 and 34 from the optical fibers 24 and 28; and fabricating a housing 20 on the basis of a calculation of an offset distance (D-d) in order to align each ferrule 22 and 26 and ball lens 30.

In order to maintain the reflection loss of the optical coupling device under −45 dB, the offset distance (D-d) is 100 μm, an angle Ø of the light passing through the optical fibers 24 and 28 with respect to the output light's traveling axis is 8.6 degrees, a space L between the optical fibers 24 and 28 is 200 μm, and an intersection of the light rays from the dual-core optical fibers 24 and 28 is 960 μm from the outer surface of the ball lens 30.

An anti-reflection film is coated onto each surface of the lens and the optical fiber, and the ball lens is designed to have a diameter of 2 mm and a wavelength of light is set to 155 μm in order that the offset distance (D-d) is 100 μm, and the angle Ø of the light passing through the optical fiber with respect to the light's traveling axis is 8.6 degrees. The method for manufacturing the optical coupling device also includes the steps of applying an anti-reflection film to each surface of the ferrules 22 and 26 and fixing the ferrules 22 and 26 to the housing 20, and pushing the ball lens 30 into the housing 20 with a predetermined pressure to fix the ball lens 30 to the housing 20 and properly position the ball lens 20.

Figure 4:
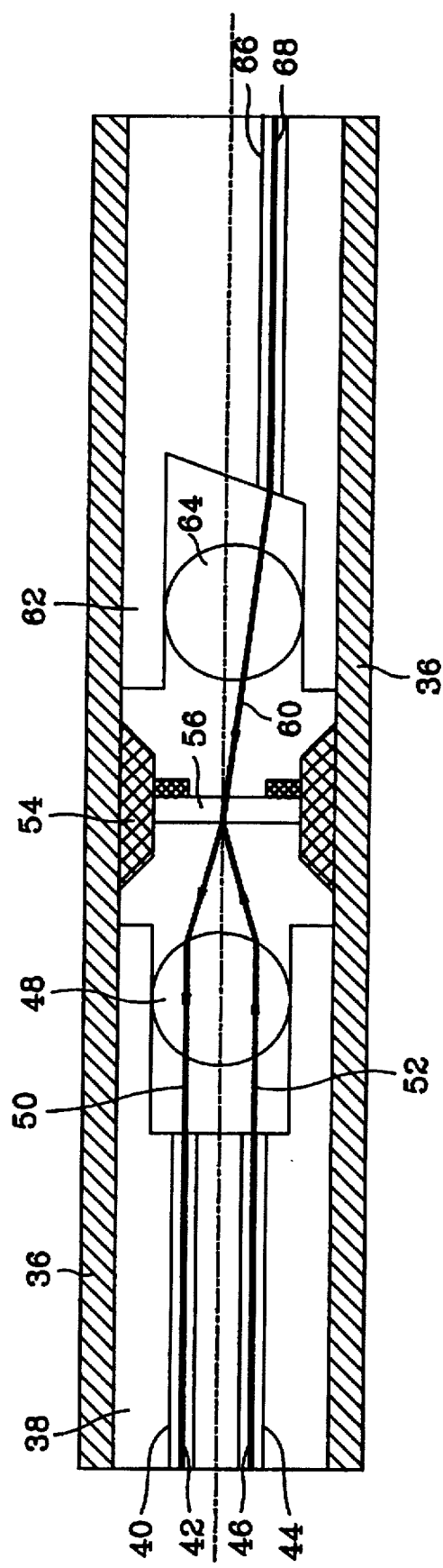
FIG. 4 is a schematic view of a wavelength division coupler employing the inventive optical coupling device.

FIG. 4 schematically depicts the construction of a wavelength division coupler employing the inventive optical coupling device. The wavelength division coupler has on one side ferrules 40 and 44 that respectively hold dual-core optical fibers 42 and 46, a ball lens 48 whose surface is coated with an anti-reflection film to focus each of light rays 50 and 52 from the dual-core optical fibers 42 and 46 to a point, and a housing 38 that holds each ferrule 40 and 44 and the ball lens 48 and aligns the ball lens 48.

On the other side of the wavelength division coupler, a ferrule 66 holding a single-core optical fiber 68 is mounted, and a ball lens 64 whose surface is coated with an anti-reflection film is disposed on one side of the ferrule 66 to focus a light ray 60 transmitted from the single-core optical fiber 68 to a point.

The wavelength division coupler also includes a housing 62 that holds the ferrule 66 and ball lens 64 and aligns the ball lens 64, a dielectric filter 56 disposed between the ball lenses 48 and 64 to reflect the light rays 50 and 52 and to transmit the light ray 60 that has passed through the single-core optical fiber, a holder 54 formed on the upper and lower parts of the filter 56 to hold the filter 56, and sleeves 36 that fix the components in position and protectively cover the components. This wavelength division coupler may be manufactured with any number of optical fibers.

Since the housing that holds both the ferrule and ball lens is aligned at the time of manufacture by being formed integrally, the present invention does not require a further alignment technique for offsetting the central axis of the ball lens from the optical axis by a predetermined distance, and the optical coupling device with the ball lens is designed to meet the characteristics of ambient environment such as temperature, vibration, shock, etc. . . . The present invention allows alignment of the ferrule and ball lens without the need for an aligning tool, which results in a reduction in the time for aligning the ferrule and lens and enhancement in the productivity.

Figure 5:
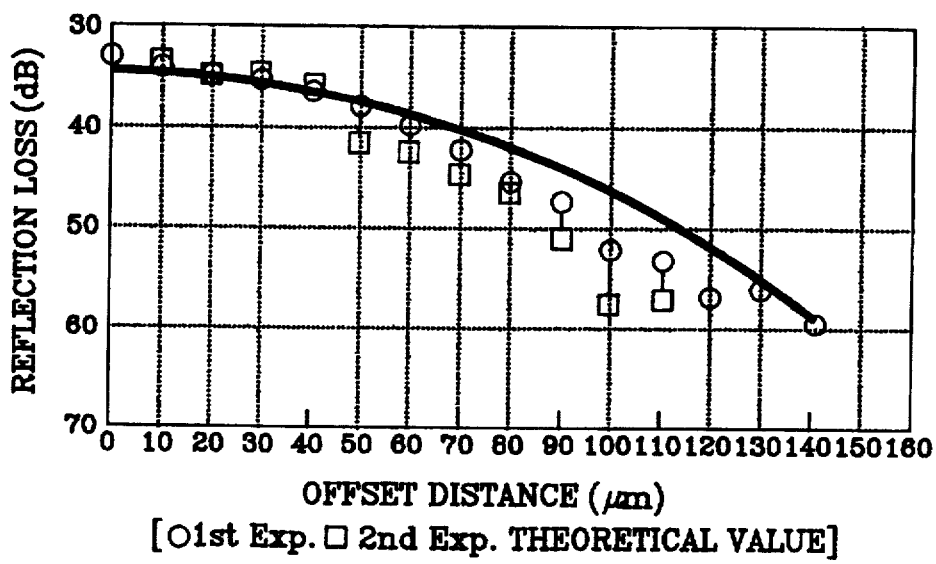
FIG. 5 graphically shows the relationship of the reflection loss and the offset distance between a ball lens and an optical fiber in axis.
Figure 6:
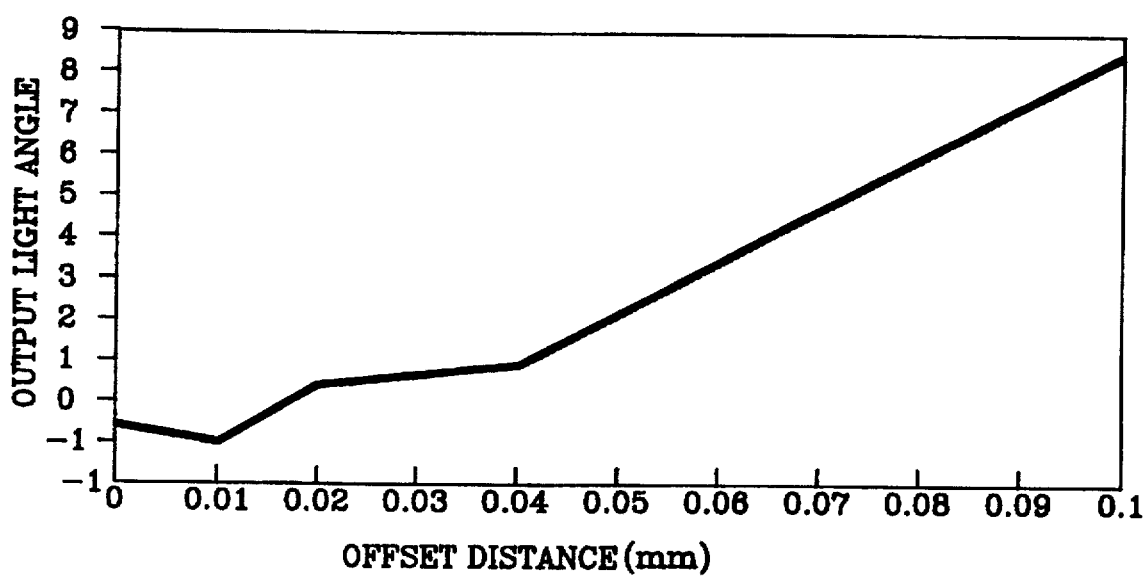
FIG. 6 graphically shows the relationship of the output light's traveling angle and the offset distance between the ball lens and optical fiber in axis.

Also, the invention provides for small offset distances to minimize reflection loss and output angle. See FIGS. 5 and 6.

Finally, the present invention offers advantages in terms of ease of manufacture of an optical coupling device employing ferrules and permits reuse of the ball lens, since the ball lens is pressure fitted into the housing without epoxying or welding.

It should be understood that the present invention is not limited to the particular embodiment disclosed herein for carrying out the present invention, but rather is defined by the scope of the appended claims.

What is claimed is:

1. An optical coupling device employing a ball lens, comprising:

a ferrule holding an optical fiber;

a ball lens for focusing light transmitted by said optical fiber; and an integral housing for simultaneously supporting and aligning said ferrule and said ball lens, wherein a distance between inner walls supporting said ferrule is smaller than a distance between inner walls supporting said ball lens and an outer dimension of said integral housing is constant.

2. An optical coupling device according to claim 1, wherein the optical fiber is at least a single-core optical fiber.

3. An optical coupling device according to claim 1, wherein the ball lens is coated with an anti-reflection film to minimize the reflection loss.

4. An optical coupling device for a wavelength division coupler comprising:

first and second ferrules formed on one side of the wavelength division coupler to support and hold each one of dual-core optical fibers;

a first ball lens disposed on one side of the first and second ferrules to focus light transmitted by the dual-core optical fibers;

an integral first housing mounted around the first and second ferrules and the first ball lens to hold the ferrules and the first ball lens and to align the first ball lens with respect to the first and second ferrules;

a third ferrule formed on the other side of the wavelength division coupler to hold a single-core optical fiber;

a second ball lens disposed on one side of the third ferrule to focus light;

an integral second housing mounted around the third ferrule and the second ball lens to hold the third ferrule and the second ball lens and to align the second ball lens with respect to the third ferrule;

a dielectric filter formed between the first and second ball lenses to reflect the light rays from the dual-core optical fibers and to transmit the light from the single-core optical fiber;

holders formed on upper and lower parts of the dielectric filter to hold the dielectric filter; and sleeves for fixing the position of all the components inside of the wavelength division coupler and for covering the components.

5. An optical coupling device according to claim 4, wherein the first and second ball lenses are each coated with an anti-reflection film to minimize the reflection loss.

6. A method for manufacturing an optical coupling device for a single-core optical fiber, comprising the steps of:

(a) fabricating a ferrule to support and hold a single-core optical fiber;

(b) inserting and fitting the single-core optical fiber into the center of the ferrule;

(c) grinding the face of the ferrule holding the single-core optical fiber;

(d) fabricating a ball lens and coating a surface thereof with an anti-reflection film for focusing light transmitted by the single-core optical fiber;

(e) fabricating a housing based on a calculation of an offset distance for aligning the ferrule and the ball lens;

(f) fixing the ferrule to the inside of the housing; and (g) pushing the ball lens into the housing with a predetermined pressure to tightly fit the ball lens to the inside of the housing without additional fixing means, thereby aligning the ferrule and the ball lens with the calculated offset distance.

7. A method according to claim 6, wherein said housing fabricating step comprises setting dimensions of said housing to align said ferrule and said ball lens to have the calculated offset distance.

8. A method for manufacturing an optical coupling device for dual-core optical fibers, comprising the steps of:

(a) fabricating a ferrule to support and hold dual-core optical fibers;

(b) inserting and fitting the dual-core optical fibers into centers of the ferrules;

(c) grinding the faces of the ferrules holding the dual-core optical fibers;

(d) fabricating a ball lens and coating a surface thereof with an anti-reflection film for focusing light rays from the dual-core optical fibers;

(e) fabricating a housing based on a calculation of an offset distance for aligning the ferrules and the ball lens;

(f) fixing each ferrule to the inside of the housing; and (g) pushing the ball lens into the housing with a predetermined pressure to tightly fit the ball lens to the inside of the housing without additional fixing means, thereby aligning the ferrule and the ball lens with the calculated offset distance.

9. A method according to claim 7 or 8, wherein the optical coupling device can maintain a reflection loss of below −45 dB.

10. A method according to claim 9, wherein the offset distance is 100 μm, and an angle of the light passing through the optical fiber with respect to the optical axis is 8.6 degrees to thereby maintain the reflection loss of below −45 dB.

11. A method according to claim 10, wherein the optical fiber is coated with an anti-reflection film, and the ball lens is 2 mm in diameter and a wavelength of the light is set to be 155 μm so that the offset distance is 100 μm, and the angle of the light from the optical fibers with respect to the optical axis is 8.6 degrees.

12. A method according to claim 8, wherein said housing fabricating step comprises setting dimensions of said housing to align said ferrule and said ball lens to have the calculated offset distance.

13. A method according to claim 8, wherein the offset distance is 100 μm, a space between the dual-core optical fibers is 200 μm, an angle of the light from the optical fibers with respect to the optical axis is 8.6 degrees, and an intersection point of the light rays from the dual-core optical fibers is 960 μm from the outer surface of the ball lens to thereby maintain a reflection loss of below −45 dB.

14. A method according to claim 7 or 8, wherein the offset distance is a difference between a focal length of the ball lens and a radius of the ball lens.

15. A method according to claim 7 or 8, wherein in step (f), the ferrule is coated with an anti-reflection film.

* * * * *